(12) United States Patent
James

(10) Patent No.: US 8,745,142 B2
(45) Date of Patent: Jun. 3, 2014

(54) METHOD AND SYSTEM FOR PUBLISHING ACD SPECIFIC DATA

(75) Inventor: Eric James, Elgin, IL (US)

(73) Assignee: Aspect Software, Inc., Chelmsford, MA (US)

( * ) Notice: Subject to any disclaimer, the term of this patent is extended or adjusted under 35 U.S.C. 154(b) by 1283 days.

(21) Appl. No.: 12/075,022

(22) Filed: Mar. 7, 2008

(65) Prior Publication Data

US 2009/0225978 A1 Sep. 10, 2009

(51) Int. Cl.
*G06F 15/16* (2006.01)

(52) U.S. Cl.
USPC ............................................ 709/206; 717/172

(58) Field of Classification Search
USPC ............................................ 709/206; 717/172
See application file for complete search history.

(56) References Cited

U.S. PATENT DOCUMENTS

| | | | |
|---|---|---|---|
| 4,737,983 A * | 4/1988 | Frauenthal et al. | 379/266.08 |
| 5,691,973 A | 11/1997 | Ramström et al. | |
| 5,960,004 A | 9/1999 | Ramström et al. | |
| 7,433,876 B2 * | 10/2008 | Spivack et al. | 1/1 |
| 2002/0054587 A1 * | 5/2002 | Baker et al. | 370/352 |
| 2004/0028212 A1 | 2/2004 | Lok et al. | |
| 2004/0210454 A1 * | 10/2004 | Coughlin et al. | 705/1 |
| 2006/0004703 A1 * | 1/2006 | Spivack et al. | 707/2 |
| 2006/0048135 A1 * | 3/2006 | Hodson et al. | 717/172 |
| 2006/0159027 A1 * | 7/2006 | Owens | 370/252 |
| 2006/0184617 A1 | 8/2006 | Nicholas et al. | |
| 2006/0206505 A1 | 9/2006 | Hyder et al. | |
| 2006/0212466 A1 | 9/2006 | Hyder et al. | |
| 2006/0229899 A1 | 10/2006 | Hyder et al. | |
| 2006/0288329 A1 * | 12/2006 | Gandhi et al. | 717/114 |
| 2007/0011665 A1 * | 1/2007 | Gandhi et al. | 717/136 |
| 2007/0043766 A1 | 2/2007 | Nicholas et al. | |
| 2007/0086584 A1 | 4/2007 | Rossini | |
| 2007/0088742 A1 * | 4/2007 | Coughlin et al. | 707/103 R |
| 2007/0094321 A1 | 4/2007 | Nussey et al. | |
| 2007/0094365 A1 | 4/2007 | Nussey et al. | |
| 2007/0094384 A1 | 4/2007 | Matsumura et al. | |
| 2007/0094389 A1 | 4/2007 | Nussey et al. | |
| 2007/0094390 A1 | 4/2007 | Nussey | |
| 2007/0106542 A1 * | 5/2007 | Coughlin et al. | 705/7 |
| 2007/0121800 A1 | 5/2007 | Rodkey et al. | |
| 2007/0204308 A1 * | 8/2007 | Nicholas et al. | 725/86 |
| 2007/0245238 A1 * | 10/2007 | Fugitt et al. | 715/700 |
| 2008/0275974 A1 * | 11/2008 | Rackiewicz | 709/223 |

FOREIGN PATENT DOCUMENTS

| | | |
|---|---|---|
| WO | WO/2006/017622 A2 | 2/2006 |
| WO | WO/2006/099299 A2 | 9/2006 |
| WO | WO/2006/115911 A2 | 11/2006 |
| WO | WO/2007/048049 A2 | 4/2007 |
| WO | WO/2007/048050 A2 | 4/2007 |

* cited by examiner

*Primary Examiner* — Thomas Dailey
(74) *Attorney, Agent, or Firm* — Husch Blackwell LLP

(57) ABSTRACT

Method and system for publishing real-time data, that is unique and specific for administering automatic contact distribution (ACD) systems, via a simple standard and in locations that are accessed readily.

44 Claims, 3 Drawing Sheets

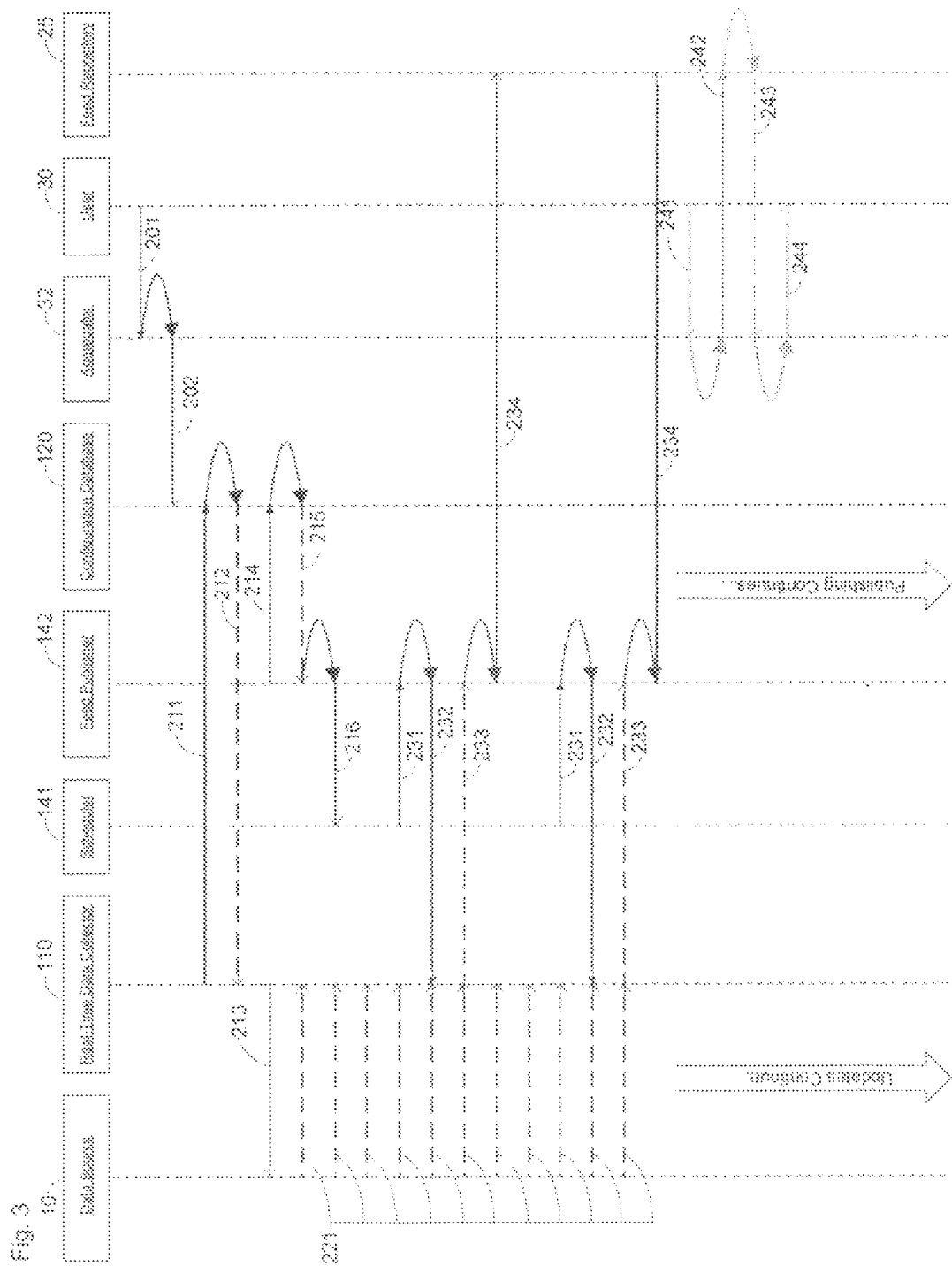

METHOD AND SYSTEM FOR PUBLISHING ACD SPECIFIC DATA

This invention pertains to publishing real-time data, that is unique and specific for administering automatic contact distribution (ACD) systems, via a simple standard and in locations that are accessed readily.

BRIEF DESCRIPTION OF THE DRAWINGS

FIG. 3 is a simplified bounce diagram illustrating an example of the process.

DETAILED DESCRIPTION OF SOME EMBODIMENTS

Figure 1:
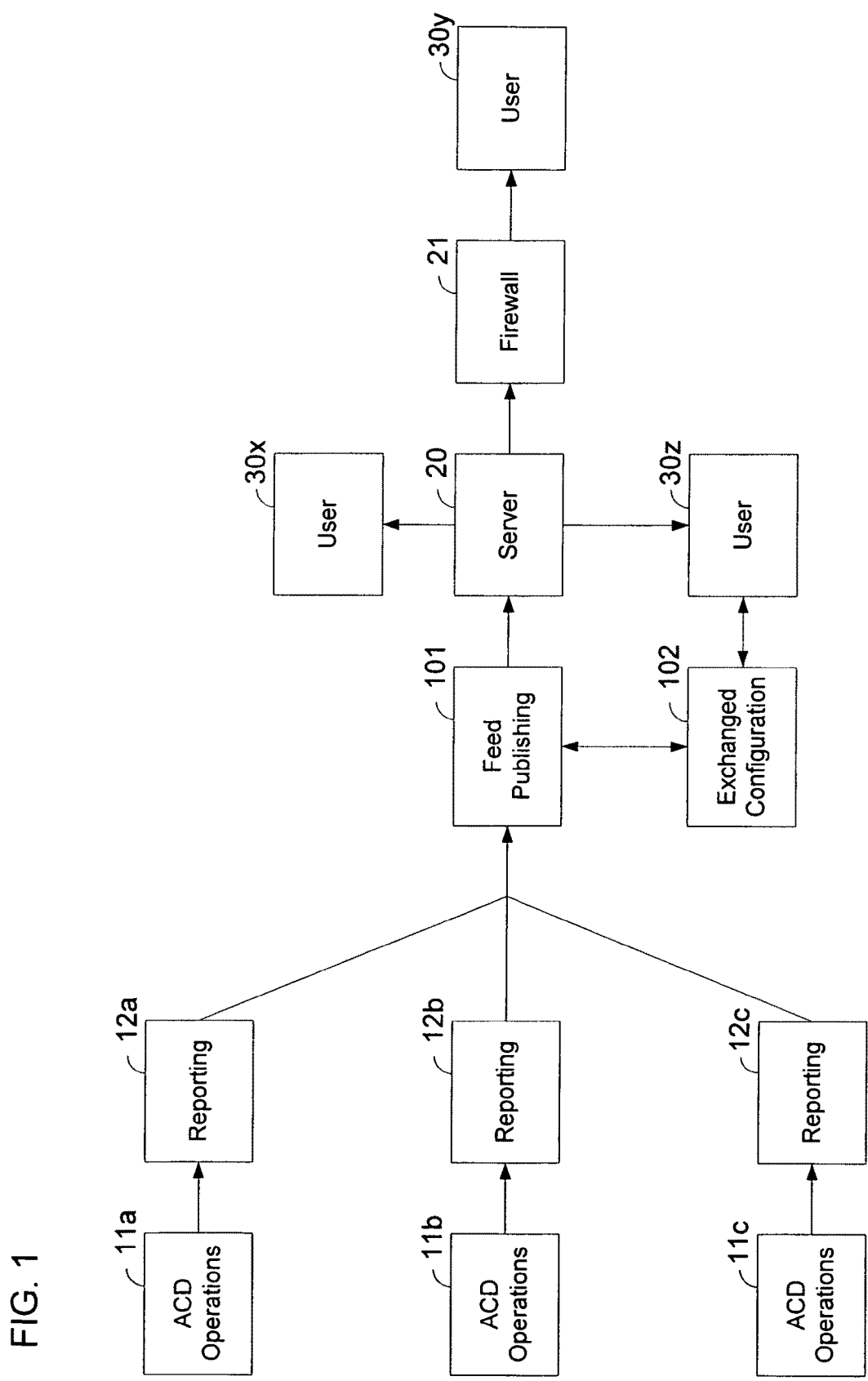
FIG. 1 is a simplified block diagram illustrating an example of the overall process and system.

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated or described.

Various types of specific reports, statistics, metrics, and other data are typically captured for use in administering ACD systems that, among other functions, distribute to available agents the telephone calls or other contacts that are made to an organization. Many of these types of data are typically collected and reported real-time, and can be used real-time in administering an ACD system. Typical users of these types of data include, for example, administrators, supervisors, and senior managers of ACD systems. Spectrum Enterprise Administrator™, Spectrum Enterprise Resource Monitor™, Spectrum Enterprise Monitor™, Spectrum Enterprise Developers Kit™, Spectrum Datamart™, Unified IP Alert Server™, Unified IP Enterprise Monitor™, Unified IP Datamart™, and Aspect Viewpoint Server™ are some of the commercial products used by organizations to collect or report these types of data for use in administering ACD systems. For discussion purposes, these types of data will be referred to as ACD administration data.

There are any number of types of ACD administration data that may be found useful for administering ACD systems. For example, data may be collected and reported about the performance, the productivity, the services that can be provided, the availability state (such as active, hold, idle, not ready, and so forth), etc. by a particular agent or by a particular category of agents; about contact processing times and backlogs in various steps of the process; about various information based on different contact types (such as telephone calls, facsimiles, e-mail, voice over internet contacts, web chats, incoming contacts, outgoing contacts, and so forth); about various information based on different services or different categories of services; about the current status of contacts; and so forth. The following are a few more specific examples of ACD administration data:

(1) for a particular service or for a particular category of services: a number or a percentage of agents in a particular availability state; a percentage of time that a particular agent or a particular category of agents is in a particular availability state; an average length of time it takes for a customer to answer a call-back; an average length of time a contact remains in a queue before being processed; an average length of time a customer is willing to wait in a queue before abandoning a contact; a number or a percentage of contacts that terminated before being placed in a queue for the particular service; a number of contacts answered; a number of contacts currently in progress; a number of contacts currently in queue; a number of unanswered contact messages (such as voice-mail or e-mail, for example); a number or a percentage of contacts that have been offered the particular service; a number or a percentage of contacts that have overflowed; a number or a percentage of contacts that have been rejected; a number or a percentage of contacts that have been rerouted; a number or a percentage of contacts serviced within a target queue time; a number or a percentage of contacts transferred to a particular agent; a number or a percentage of contacts transferred to a particular category of agents; a number or a percentage of contacts transferred to a particular external source; a number or a percentage of contacts transferred to a particular category of external sources; a number or a percentage of contacts transferred to a different service; a longest queue wait time; a highest number of contacts in queue for the particular service; productive time of a particular agent; productive time of a particular category of agents; a number or a percentage of contacts that were serviced; a number or a percentage of a particular type of contact; a number of consultation contacts; etc.

(2) for a particular agent: a time when the particular agent began servicing a particular contact; an availability state of the particular agent; a percentage of time the particular agent is in a particular availability state; a length of time the particular agent has been in a particular availability state; different services which the particular agent can provide; a number of contacts answered; a number or a percentage of contacts that have been rejected; a number or a percentage of contacts that have been rerouted; a number of contacts transferred to the particular agent; a number or a percentage of contacts transferred to a particular external source; a number or a percentage of contacts transferred to a particular category of external sources; productive time; a number or a percentage of a particular type of contact; a number of consultation contacts; etc.

(3) for a particular category of agents: an average length of time that agents of the particular category of agents have been in a particular availability state; an average percentage of time that agents of the particular category of agents are in a particular availability state; different services which the particular category of agents can provide; a number or a percentage of agents who can provide a particular service; a number of agents; a number or a percentage of agents in a particular availability state; a number of contacts answered; a number or a percentage of contacts that have been rejected; a number or a percentage of contacts that have been rerouted; a number or a percentage of contacts transferred to the particular category of agents; a number or a percentage of contacts transferred to a particular external source; a number or a percentage of contacts transferred to a particular class of external sources; productive time; an average length of time a contact remains in a queue before being processed; a number of contacts currently in progress; a number of contacts currently in queue; a number of unanswered contact messages; a number or a percentage of contacts that have been offered a particular service; a number or a percentage of contacts that have overflowed; a number or a percentage of contacts serviced within a target queue time; a number or a percentage of contacts transferred to a particular agent; a longest queue wait time; a highest number of contacts in queue; productive time; a number or a percentage of a particular type of contact; a number of consultation contacts; etc.

(4) for a particular type of contact: a number or a percentage of agents in a particular availability state; a percentage of time that a particular agent or a particular category of agents is in a particular availability state; an average length of time a contact remains in a queue before being processed; an average length of time a customer is willing to wait in a queue before abandoning a contact; a number of contacts that terminated before being placed in a queue for a particular service; a number of contacts answered; a number of contacts currently in progress; a number of contacts currently in queue; a number of unanswered contact messages; a number or a percentage of contacts that have overflowed; a number or a percentage of contacts that have been rejected; a number or a percentage of contacts that have been rerouted; a number or a percentage of contacts serviced within a target queue time; a number or a percentage of contacts transferred to a particular agent; a number or a percentage of contacts transferred to a particular category of agents; a number or a percentage of contacts transferred to a particular external source; a number or a percentage of contacts transferred to a particular category of external sources; a longest queue wait time; a highest number of contacts in queue for the particular type of contact; productive time of a particular agent; productive time of a particular category of agents; a number or a percentage of contacts that were serviced; a number of consultation contacts; a number or a percentage of contacts that have been offered a particular service; etc.

In some embodiments, the availability and usefulness of ACD administration data is enhanced by publishing it via a simple standard in locations that are accessed readily. An example is using a protocol such as an RSS protocol (sometimes called Really Simple Syndication). There is no intention to limit the protocol to any one version or release of RSS, and it is expected that there will be hybrids and extensions of existing standard formats, similar formats that have not yet been released, and other similar technologies. The content is structured data, such as any HyperText Markup Language (HTML), Dynamic HTML (DHTML), extensible Markup Language (XML), Electronic Data Interchange (EDI), JavaScript or Flash based content. The current data is published in a feed that may include actual data, direct links to actual data, and links to other web pages, views, or other electronic sources that provide links to actual data. The term "actual data" is intended to mean substantive information that itself may be useful for administering ACD systems, as opposed to mere links to such information.

The current data (i.e., the feed content) are available through software called a reader or aggregator, that may be a stand alone program or may be integrated with a browser, an e-mail program or other programs. If the user has subscribed to a particular feed by supplying to the aggregator a link to the feed (for example, by clicking on an icon), the aggregator automatically obtains updates of the current data and can alert the user of those updates without the need for a user request.

An example of the overall process and system is illustrated in FIG. 1. Ongoing operations in various different ACD systems are represented as blocks 11a, 11b and 11c, though there might be a single ACD system or any number of ACD systems. Blocks 12a, 12b and 12c represent the extraction and reporting of ACD administration data in connection with respective ACD systems, that can be transmitted to a publishing service. This reporting may be platform-specific. Block 101 represents the publishing in which the ACD administration data reported in blocks 12 are used to create or update feeds published in a platform-neutral protocol such as an RSS protocol. Published current data are available through a server 20 to users such as users 30x, 30y and 30z. There can be any number of users 30.

In the example of FIG. 1, user 30x represents an example of access to a feed on an internal network. User 30y represents an example of access to a feed on an external network. The feed may be protected by a firewall 21 or other means for controlling access. For example, access to feeds may be controlled by authenticating against a directory (e.g., a system based on Hypertext Transfer Protocol Secure (HTTPS) with Windows Authentication and Authorization via Active Directory), by controlling access to a share on the hosting machine, by password protection, by encryption, or by any other tools designed to control access.

A user 30 may access a feed through any of a variety of ways that can support accessing and processing a feed in a protocol such as an RSS protocol. Examples of such ways include, for example, browsers on personal computers as well as mobile telephones, personal digital appliances, etc. that support internet or intranet access. This allows update alerts and real-time access to ACD administration data from virtually anywhere in the world, even though that data initially may have been collected in one or more platform-specific reporting applications.

Not every way of accessing a feed will necessarily have the same capabilities. As an example, there may be text to voice conversions to provide audio-formatted messages to users. As another example, a user 30z may download or otherwise obtain a custom aggregator that has enhanced abilities to parse and make sense of any raw data available in the feed, and that may provide interactive capability to custom-tailor the presentation of current data for the needs of a particular user or of a particular group of users (such as a team member in a particular business unit or department). Some examples of means for providing an aggregator are making it downloadable via a Universal Resource Locator (URL) in a web page, downloading it each time the feed is accessed, downloading it to one or more specific users in response to a direction to do so, and so forth. The availability of a custom aggregator may be controlled depending on the nature of the capabilities of the aggregator.

In the example of FIG. 1, block 102 represents enchanced configuring for allowing the creation of different presentations, of the content embedded in a feed, that are accessible by custom aggregators. As one example, Flash content can be embedded in a feed that remains platform-neutral but allows for interactive functionality. The standard presentation of that feed would still be available via standard aggregators, without the need for any special software or applications. However, a custom aggregator could enhance the usefulness of the ACD administration data by effecting modified display and layout of the data, or by featuring specific information important to the user.

For example, the ACD administration data could be presented in a raw or text format, in a chart format, in a graph format, in interactive Flash based formats allowing the user to switch dynamically between presentations, and so forth. As an example, an aggregator might send instructions with information such as: an identity of a feed; a location where the current data should be sent for the user; an alert schedule; and a desired presentation format such as a raw text, a line graph, a bar graph, a pie chart, a pyramid chart, and so forth. As an example, a user could define a matrix of ACD system entities and real-time data elements to be reported for each entity, and could specify a presentation format such as charts, graphs, text in row and column positions, etc.

Different alert schedules can be based, for example, on specific times, on an amount of time elapsed since the last alert, on every time that the current data are updated, on performance characteristics, combinations of these factors, and so forth. Performance characteristics can include, for example, a certain data element having a predetermined value, a certain data element changing by a predetermined amount or failing to change by a predetermined amount within a predetermined time period, combinations of these performance characteristics, and so forth.

Figure 2:
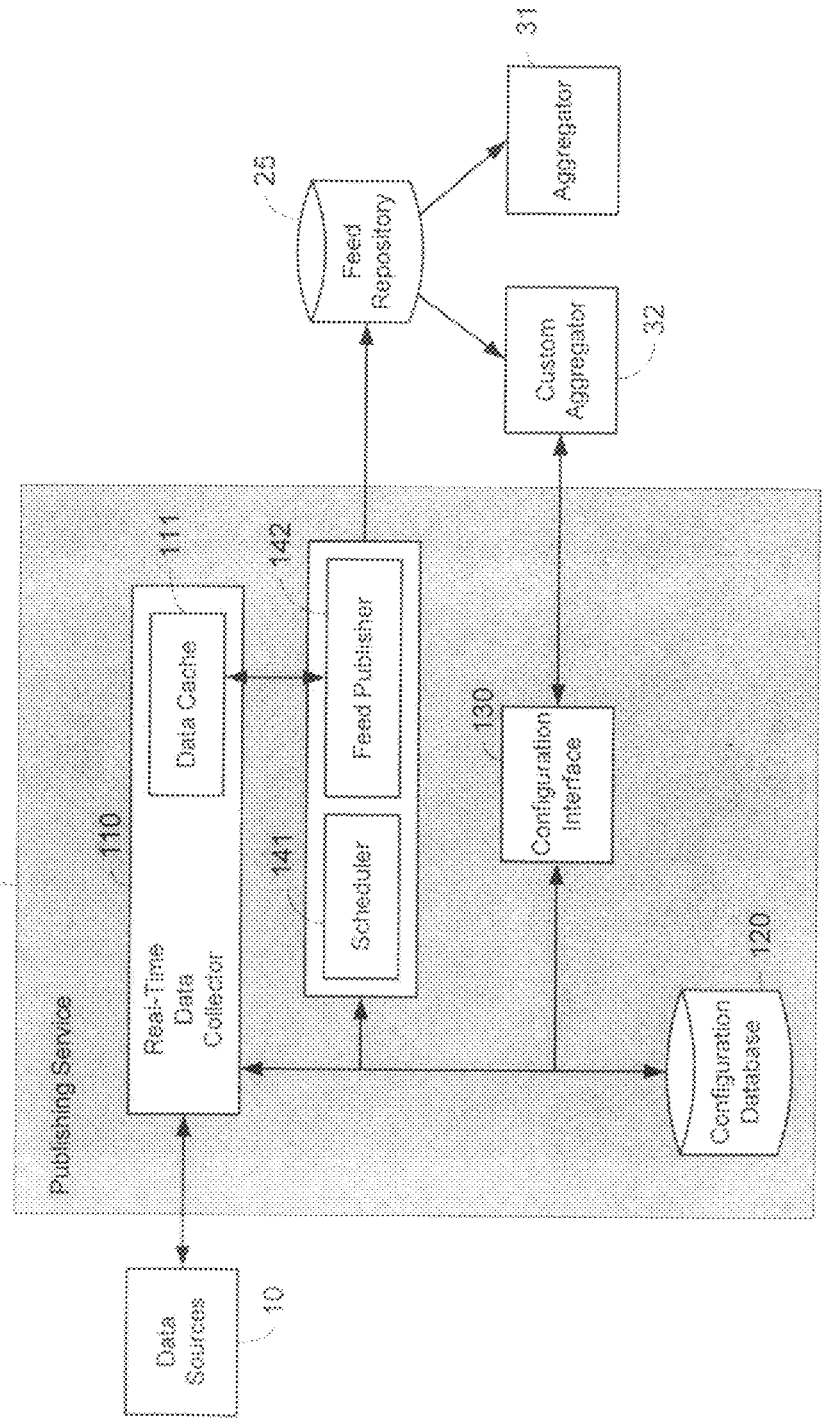
FIG. 2 is a simplified block diagram illustrating an example of the publishing service.

An example of a publishing service 100 is illustrated in FIG. 2. Sources of ACD administration data are represented generically as block 10. The published content may reside in a feed repository 25, and may be accessed by aggregators such as aggregators 31 and 32. Aggregator 31 represents a browser based or standards based aggregator, that is readily available in many personal computers and other devices that support internet or intranet access. Aggregator 32 represents a custom aggregator for accessing enhanced presentations of the ACD administration data. Some custom aggregators 32 might function in conjunction with a standard aggregator 31, and other custom aggregators 32 might function independent of a standard aggregator 31. A custom aggregator 32 can provide to publishing service 100 configuration information about the presentation desired by the user.

In the example of FIG. 2, block 10 represents one or more data sources, and a publishing service 100 obtains the existing ACD administration data from sources 10. For example, this can be accomplished by subscribing to data reported in connection with one or more ACD systems, and reading applicable external configuration files. The publishing service 100 publishes the captured data to a defined location in a platform-neutral protocol. It can be opened directly for viewing by standard applications, such as Firefox or Internet Explorer, for example. Continuing with the example of publishing service 100 of FIG. 2, real-time data collector 110 obtains the ACD administration data from sources 10. Data collector 110 can comprise a data cache 111. Configuration interface 130 can receive instructions from a particular custom aggregator 32 regarding a desired presentation configuration, and can store such information in configuration database 120. Configuration database 120 can be accessed by data collector 110 and publisher 142 for current configuration instructions. Scheduler 141 schedules updates, and publisher 142 accesses current content from data cache 111 and publishes the current data to a repository 25 where it can be accessed by the aggregators.

Design of any of these individual components is known to those of ordinary skill in the art. Configuration interface 130 can constitute a means for receiving instructions of the user. Configuration database 120 can constitute a means for storing those instructions. Real-time data collector 110, publisher 142 and scheduler 141 are examples of means for checking for new instructions. Real-time data collector 110 can constitute a means for subscribing to ACD administration data sources and a means for collecting the data elements. Real-time data collector 110, publisher 142 and scheduler 141 are examples of means for scheduling the collecting of the data elements. Publisher 142 can constitute a means for reformatting current data in accordance with a platform-neutral protocol, and a means for alerting the user in accordance with an alert schedule (as discussed above). Scheduler 141 can An example of the process is illustrated in FIG. 3. In step 201 of that example, a user 30 goes into custom aggregator 32 and creates a feed presentation configuration. In step 202, the configuration instructions are conveyed to publishing service 100 and stored in configuration database 120. This sequence would occur whenever initiated by a user 30. As discussed above, an aggregator might send instructions with information such as: an identity of a feed, a location where the current data should be sent for the user, an alert schedule, and a desired presentation format.

In step 211, real-time data collector 110 periodically checks for new configurations in configuration database 120. Such checking can result, for example, from scheduled polling or from a trigger whenever data is stored in database 120. In step 212, data collector 110 reads the configuration information from the database 120. In step 213, data collector 110 subscribes to the real-time elements of a new configuration, found in database 120, via the appropriate ACD administration data sources 10.

In step 214, publisher 142 also periodically checks for new configurations in configuration database 120. Such checking also can result, for example, from scheduled polling or from a trigger whenever data is stored in database 120. In step 215, publisher 142 reads the configuration information from the database 120. In step 216, publisher 142 creates a scheduled event in scheduler 141 to trigger publisher 142 to write current data values into a newly configured feed.

In step 221, the appropriate ACD administration data sources 10 emit events to real-time data collector 110 on a continuing basis whenever the subscribed real-time elements change. This allows the data collector 110 always to maintain an up-to-date window into the applicable ACD systems, and to provide current data to the defined feeds.

In step 231, scheduler 141 raises an event to publisher 142 to trigger publisher 142 to request, in step 232, the latest data from real-time data collector 110. This occurs on a continuing basis, for example with a specified frequency. In step 233, publisher 142 obtains the current data from data collector 110. Publisher 142 reformats the data consistent with the protocol, such as an RSS protocol, being used for the feed. In step 234, the publisher 142 publishes the current data to the targeted location in repository 25.

In step 241, user 30 requests the current data using aggregator 32 that, in step 242, accesses the feed location in repository 25 and, in step 243, downloads the current data from repository 25. In step 244, aggregator 32 displays the current data in the desired configuration that user 30 created in step 201. Custom aggregator 32 may enable dynamic functionality such as editing or reconfiguring the elements associated with the displayed data. In some embodiments, this functionality will be enabled by access to different applications, possibly by links to external applications in the ACD systems that were the sources 10 of the ACD administration data in the feed.

From the foregoing, it will be observed that numerous modifications and variations can be effectuated without departing from the true spirit and scope of the novel concepts of the present invention. It is to be understood that no limitation with respect to the specific embodiments illustrated or described is intended or should be inferred.

What is claimed is:

1. A method for automatically electronically publishing current data for a user to use in real-time administering automatic contact distribution (ACD) systems, the method comprising:
   receiving instructions of the user, the instructions comprising requirements regarding a configuration of an electronic display of the current data, the current data comprising real-time data elements necessary for compliance with the instructions and storing the instructions in a configuration database;

subscribing to at least one ACD administration data source for real-time receipt of the data elements;

collecting the real-time data elements on a continuing real-time basis;

reformatting the current data in accordance with a predetermined platform-neutral protocol, if the current data are not already formatted in accordance with the predetermined platform-neutral protocol;

publishing the current data in the platform-neutral protocol to a predetermined location in accordance with the stored instructions and periodically checking the configuration database for new configuration information;

downloading a custom aggregator to the user for reconfiguring the published data enabled by links to external applications in the ACD system to provide interactive capability and enhanced presentation of ACD administration data and providing automatic update alerts to the user in response to automatically obtained updates of published data;

alerting the user in accordance with an alert schedule and in response to automatically obtained updates of the published data.

2. The method according to claim 1, the at least one ACD administration data source comprising a plurality of ACD administration data sources.

3. The method according to claim 1, the collecting of the data elements comprising collecting a set of data elements from at least one of the at least one ACD administration data sources;

the set of data elements not being already formatted in accordance with the predetermined platform-neutral protocol when collected from the at least one of the at least one ACD administration data sources.

4. The method according to claim 1, the collecting of the data elements comprising collecting a first set of data elements from a first one of the at least one ACD administration data sources;

the collecting of the data elements further comprising collecting a second set of data elements from a second one of the at least one ACD administration data sources;

the first and second sets being formatted in accordance with different protocols, respectively, when collected from the first and second ones, respectively, of the at least one ACD administration data sources.

5. The method according to claim 1, the current data, that are published in the predetermined location, comprising direct links to substantive information for use in administering the ACD systems.

6. The method according to claim 1, the current data, that are published in the predetermined location, comprising first links to other electronic sources;

the other electronic sources comprising second links to substantive information for use in administering the ACD systems.

7. The method according to claim 1, the current data, that are published in the predetermined location, being accessible via an internal network.

8. The method according to claim 1, the current data, that are published in the predetermined location, being accessible via an external network.

9. The method according to claim 1, access being controlled to the current data published in the predetermined location.

10. The method according to claim 9, the access being controlled by at least one step selected from a group consisting of: authenticating against a directory, controlling access to a share on a hosting machine, using a firewall, using password protection, and using encryption.

11. The method according to claim 1, further comprising:
providing an aggregator for use by the user;
the aggregator being capable of reading the current data published in the predetermined location.

12. The method according to claim 1, further comprising:
providing an aggregator for use by the user;
the aggregator being capable of automatically receiving alerts pursuant to the alerting step, without a need for the user to request an update of the current data.

13. The method according to claim 1, further comprising:
providing an aggregator for use by the user;
the aggregator being capable of providing the instructions.

14. The method according to claim 1, further comprising:
providing an aggregator for use by the user;
the aggregator being capable of facilitating text to voice conversion to provide an audio-formatted message to the user.

15. The method according to claim 1, further comprising:
providing an aggregator for use by the user;
the aggregator being capable of providing interactive flash based formats allowing the user to switch dynamically between presentations.

16. The method according to claim 15, the interactive functionality comprising at least one ability selected from a group consisting of: to edit the electronic display of the current data, to reconfigure the electronic display of the current data, to feature specific information of the current data, and to switch between different electronic display presentations of the current data.

17. The method according to claim 1, the instructions further comprising an identity of the current data, a location where the current data should be sent for the user, and the alert schedule.

18. The method according to claim 1, the configuration of the electronic display of the current data comprising at least one format selected from a group consisting of a chart format, a graph format, a line graph format, a bar graph format, a pie chart format, a pyramid chart format, a format allowing dynamic switching between different display presentations, and a matrix format showing a plurality of the data elements for each one of a plurality of the ACD systems.

19. The method according to claim 1, the alert schedule being based on at least one criterion selected from a group consisting of: specific times, an amount of time elapsed since a last alert, every time that the current data are updated, specific performance characteristics, a specific one of the data elements having a predetermined value, a specific one of the data elements changing by a predetermined amount, and a specific one of the data elements failing to change by a predetermined amount within a predetermined time period.

20. The method according to claim 1, further comprising:
storing the instructions in a configuration database;
checking the configuration database for new instructions.

21. The method according to claim 20, further comprising creating an event to schedule the collecting step pursuant to the instructions.

22. The method according to claim 20, the checking step occurring based on at least one criterion selected from a group consisting of: specific times, an amount of time elapsed since a last check, and a trigger when information is stored in the configuration database.

23. The method according to claim 1, the current data comprising at least one type of data selected from a group consisting of performance of a particular agent, productivity of a particular agent, services that a particular agent can provide, availability state of a particular agent, performance of a particular category of agents, productivity of a particular category of agents, services that a particular category of agents can provide, percentage of agents of a particular category of agents in a particular availability state, contact processing times, contact backlogs, performance information for a particular contact type, productivity information for a particular contact type, performance information for a particular service, productivity information for a particular service, performance information for a particular category of services, productivity information for a particular category of services, and a current status of contacts.

24. A system for automatically electronically publishing current data for a user to use in real-time administering automatic contact distribution (ACD) systems, the publishing system comprising:

a configuration interface designed to receive instructions, the instructions comprising requirements regarding a configuration of an electronic display of the current data, the current data comprising real-time data elements necessary for compliance with the instructions;

a configuration database for storing the instructions;

a data collector designed to obtain the data elements in real-time from at least one ACD administration data source;

the data collector further being designed to check the configuration database for new instructions;

a publisher designed to reformat the current data in accordance with a predetermined platform-neutral protocol, if the data elements obtained by the data collector are not already formatted in accordance with the predetermined platform-neutral protocol;

the publisher further being designed to publish the current data in accordance with the instructions stored in the configuration database in the platform-neutral protocol to a predetermined location and periodically checking the configuration database for new configuration information;

at least one user access device for receiving the published data and for downloading a custom aggregator for reconfiguring the published data enabled by links to external applications in the ACD system to provide interactive capabilities for the user and enhanced presentation of ACD administration data and providing automatic update alerts to the user in response to automatically obtained updates of published data;

the publisher further being designed to alert the user in accordance with an alert schedule and in response to automatically obtained updates of the published data.

25. The system according to claim 24, further comprising:

a data cache for the data elements obtained by the data collector;

a scheduler designed for triggering the publisher to obtain the data elements from the data cache;

the publisher further being designed to check the configuration database for new instructions;

the publisher further being designed to create an event in the scheduler based on the instructions.

26. The system according to claim 25, the checking of the configuration database by the publisher occurring based on at least one criterion selected from a group consisting of: specific times, an amount of time elapsed since a last check, and a trigger when information is stored in the configuration database.

27. The system according to claim 24, the data elements comprising first and second sets of data elements obtained, respectively, from first and second ones of the at least one ACD administration data sources;

the first and second sets being formatted with different protocols, respectively, when obtained from the first and second ones, respectively, of the at least one ACD administration data sources.

28. The system according to claim 24, access being controlled to the current data published in the predetermined location.

29. The system according to claim 24, further comprising:

an aggregator that is downloadable to the user;

the aggregator being designed to provide the instructions.

30. The system according to claim 24, further comprising:

an aggregator that is downloadable to the user;

the aggregator being designed to provide interactive flash based formats allowing the user to switch dynamically between presentations.

31. The system according to claim 30, the interactive functionality comprising at least one ability selected from a group consisting of: to edit the electronic display of the current data, to reconfigure the electronic display of the current data, to feature specific information of the current data, and to switch between different electronic display presentations of the current data.

32. The system according to claim 24, the instructions further comprising an identity of the current data, a location where the current data should be sent for the user, and the alert schedule.

33. The system according to claim 24, the configuration of the electronic display of the current data comprising at least one format selected from a group consisting of: a chart format, a graph format, a line graph format, a bar graph format, a pie chart format, a pyramid chart format, a format allowing dynamic switching between different display presentations, and a matrix format showing a plurality of the data elements for each one of a plurality of the ACD systems.

34. The system according to claim 24, the alert schedule being based on at least one criterion selected from a group consisting of specific times, an amount of time elapsed since a last alert, every time that the current data are updated, specific performance characteristics, a specific one of the data elements having a predetermined value, a specific one of the data elements changing by a predetermined amount, and a specific one of the data elements failing to change by a predetermined amount within a predetermined time period.

35. The system according to claim 24, the checking of the configuration database by the data collector occurring based on at least one criterion selected from a group consisting of: specific times, an amount of time elapsed since a last check, and a trigger when information is stored in the configuration database.

36. The system according to claim 24, the current data comprising at least one type of data selected from a group consisting of: performance of a particular agent, productivity of a particular agent, services that a particular agent can provide, availability state of a particular agent, performance of a particular category of agents, productivity of a particular category of agents, services that a particular category of agents can provide, percentage of agents of a particular category of agents in a particular availability state, contact processing times, contact backlogs, performance information for a particular contact type, productivity information for a particular contact type, performance information for a particular service, productivity information for a particular service, performance information for a particular category of services, productivity information for a particular category of services, and a current status of contacts.

37. A system for automatically electronically publishing current data for a user to use in real-time administering automatic contact distribution (ACD) systems, the publishing system comprising:
- means for receiving instructions of the user, the instructions comprising
- requirements regarding a configuration of an electronic display of the current data, the
- current data comprising real-time data elements necessary for compliance with the instructions and for storing the instructions in a configuration database;
- means for subscribing to at least one ACD administration data source for real-time receipt of the data elements;
- means for collecting the data elements;
- means for reformatting the current data in accordance with a Really Simple Syndication (RSS) protocol, if the current data are not already formatted in accordance with the RSS protocol;
- means for publishing the current data to a predetermined location in the RSS protocol in accordance with the stored instructions and periodically checking the configuration database for new configuration information;
- means for providing user access to the published data and for downloading a customer aggregator for reconfiguring the published data enabled by links to external applications in the ACD system to provide interactive capabilities to the user and enhanced presentation of ACD administration data and for providing automatic update alerts to the user in response to automatically obtaining updates of published data;
- means for alerting the user in accordance with an alert schedule and in response to automatically obtained updates of the published data.

38. The system according to claim 37, further comprising means for controlling access to the current data published in the predetermined location.

39. The system according to claim 37, further comprising:
- means for providing an aggregator to the user;
- the aggregator being designed to provide the instructions.

40. The system according to claim 37, further comprising:
- means for providing an aggregator to the user;
- the aggregator being designed to provide interactive flash based formats allowing the user to switch dynamically between presentations.

41. The system according to claim 40, the interactive functionality comprising at least one ability selected from a group consisting of: to edit the electronic display of the current data, to reconfigure the electronic display of the current data, to feature specific information of the current data, and to switch between different electronic display presentations of the current data.

42. The system according to claim 37, the instructions further comprising an identity of the current data, a location where the current data should be sent for the user, and the alert schedule.

43. The system according to claim 37, further comprising:
- means for storing the instructions;
- means for checking for new instructions.

44. The system according to claim 37, further comprising means for scheduling the collecting of the data elements.

* * * * *